July 1, 1958      F. D. WERNER      2,841,440
AIR NOISE ELIMINATOR ATTACHMENT FOR VEHICLES
Filed Feb. 16, 1956
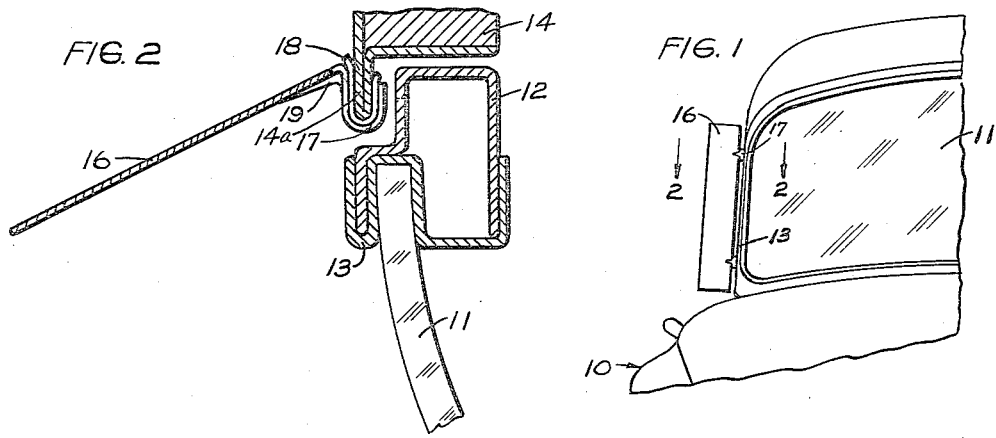
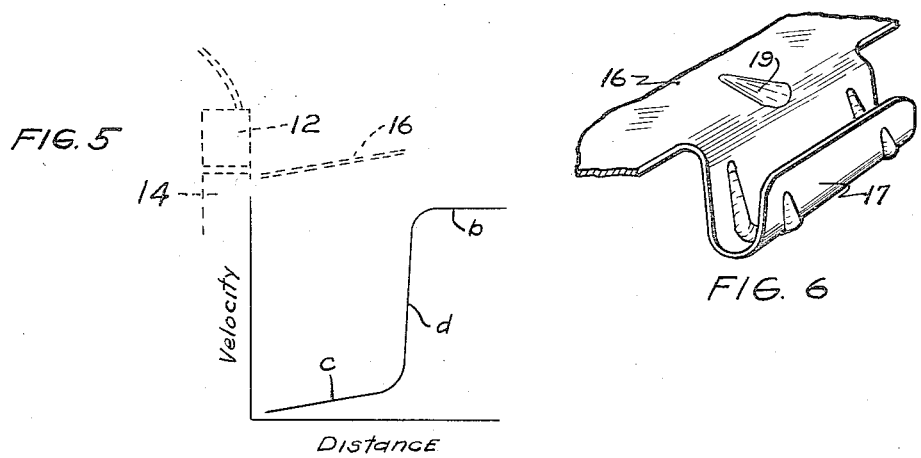
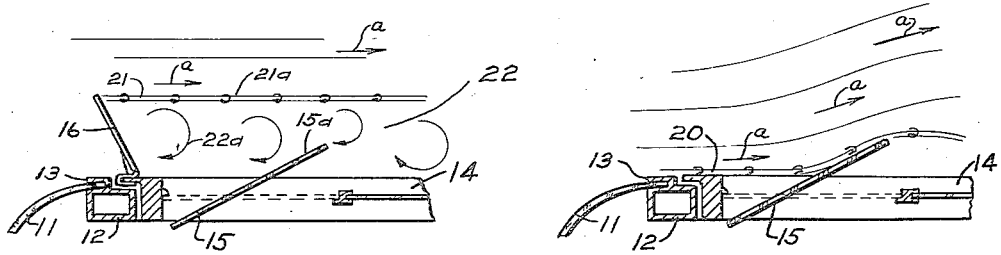
INVENTOR.
FRANK D. WERNER
BY
Williamson, Schroeder, Adams + Meyers
ATTORNEYS

United States Patent Office 2,841,440
Patented July 1, 1958

2,841,440
AIR NOISE ELIMINATOR ATTACHMENT FOR VEHICLES

Frank D. Werner, Rosemount, Minn., assignor to Marquette Engineering Company, Minneapolis, Minn., a partnership Application February 16, 1956, Serial No. 565,921

4 Claims. (Cl. 296—44)

This invention relates to the method of an apparatus for reducing noise caused by high velocity relative movement of air and rigid surfaces and more specifically relates to an accessory and a method adapted for reducing the air noise in an automotive type vehicle traveling at high speeds.

As a vehicle travels at high speed there is relative movement of the air and the vehicle, and for simplicity this relative movement is referred to herein as movement of the air along the vehicle.

I have found in experimentation that as a vehicle moves at high speeds air moves rearwardly around the windshield thereof and thence longitudinally along the body portions, and due to the effect of the air encountering various protruding surfaces at the forward end of the generally longitudinally extending vehicle body portions, such as the rain gutter or windshield molding portions, or due to natural, inherent instability well known in the science of aerodynamics, a thin layer of highly turbulent air is formed in close proximity with the vehicle body portions. When this thin layer of highly turbulent air impinges upon a surface which is angularly disposed relative to the direction of movement of the layer, such as an open vent window of a vehicle, noise is generated, which is transmitted into the vehicle. I have also found that the acoustical energy or noise created will decrease as the energy of the turbulence decreases and as the mean velocity of the flow decreases, in the case of such a layer of highly turbulent air. It is known that the air in this thin layer moves as an assembly of random and small vortices. Most of the noise created by the air flow will be caused by this thin layer impinging against the small vent window which is positioned at the forward portion of the front door of the vehicle if the vent window is opened far enough.

This thin layer of highly turbulent air may be referred to as a shear layer because at the outer side of the layer the air is moving at a high velocity relative to the air and vehicle body portions at the inner side of the layer.

An object of my invention is to provide a new and improved device of extremely simple and inexpensive construction and operation for very substantially reducing the noise created due to high velocity movement of air relative to substantially rigid surfaces against which the air impinges.

Another object of my invention is to provide a novel attachment for an automotive vehicle for reducing the air noise normally present when the vehicle moves rapidly, by obstructing the thin shear layer of highly turbulent air at a position adjacent the forward portion of such a vehicle and deflecting the shear layer of highly turbulent air outwardly away from the body portions.

Another object of my invention is to provide a new and improved method in the art of reducing noise produced by air when a vehicle moves at a high rate of speed and consisting in the steps of obstructing flow of air in close proximity with the longitudinally extending body portions at a position adjacent the forward end of the vehicle and deflecting the air outwardly from the vehicle body portions to reduce the amount of high speed and highly turbulent air which impinges on irregularities such as the vent window of the vehicle body portions.

These and other objects and advantages of my invention will more fully appear from the following description made in connection with the accompanying drawings wherein like reference characters refer to similar parts throughout the several views and in which:

Fig. 1 is a front elevation detail view of a portion of an automotive vehicle having the invention secured thereto;

Fig. 2 is a detail section view taken on a plane indicated at 2—2 of Fig. 1;

Fig. 3 is a view similar to Fig. 2 showing a detailed section of the body portions and vent window of an automotive vehicle and indicating the normal air flow past the irregular body portions when the vehicle is moved at high speeds without the present invention attached thereto;

Fig. 4 is a view similar to Fig. 3 showing the air flow along the irregular body portions of the vehicle with the present invention secured thereto;

Fig. 5 is a graph to show the relationship between the velocity of air moving adjacent the vehicle body portions relative to the distances outwardly from the body portions with the present invention attached thereto; and Fig. 6 is a detail perspective view of a portion of the present invention.

One application of the present invention is related to high speed vehicles which travel rapidly through air. It will be recognized that as such a vehicle travels there will be a high velocity relative movement between substantially rigid surface portions of the vehicle and the air. A conventional automotive vehicle indicated in general by numeral 10 is provided with a windshield 11 which is secured to frame portions 12 of the vehicle by means of a molding 13. The frame portions adjacent the windshield 11 may constitute a door jamb. The body portions of the vehicle will include the front door 14 of the vehicle which has a conventional outwardly swingable vent window 15 mounted therein. It will be noted that the rear portion 15a of the vent window 15 extends outwardly from the outer surface of door 14 within the range of normal swinging of the window, and thereby constitutes one of the irregularities in the generally longitudinally extending body portions of the vehicle.

One embodiment of the present invention is shown in the drawings and is described herein. The invention as shown comprises an elongated and substantially rigid imperforate plate 16 which is adapted for mounting at the forward end of the longitudinally extending body portions of the vehicle and generally in an upright plane which extends transversely of the direction of travel of the vehicle. Means are provided for securing the plate 16 to the forward or leading edge of the front door 14 and in the form shown, such means comprise a clamping bracket 17 which is formed integrally of the plate 16 and which is crimped or bent at 19 to increase the strength of the bracket against bending with respect to the plate 16. The outer end of bracket 17 is doubled back upon itself to comprise a pair of cooperative clamping jaws adapted for mounting on opposite sides of the forwardly extending flange portion or lip 14a of door 14. Under bracket 17 is a rubber shim 18 which protects the paint on lip 14a and increases friction between bracket 17 and lip 14a. Bracket 17 is bent so that it springs slightly open upon being forced in place over shim 18 and lip 14a, thereby providing the clamping force which serves to preserve the attachment between plate 16 and lip 14a. The bracket 17 is constructed to normally position the imperforate plate 16 in outstanding relation relative to the vehicle body portions. The imperforate plate 16 is of sufficient length as to provide a wake of relatively low velocity air flow which envelopes substantially all of the irregularities such as vent window 15. Imperforate plate 16 extends sufficiently outwardly from the longitudinally extending vehicle body portions so that the outer surface of the low velocity wake thereof is disposed outwardly of the rear edge portion 15a of vent window 15 within its usual limits of outward swinging.

As best seen in Fig. 3 the normal flow of air around the windshield 11 and thence rearwardly in the direction of arrows a along the longitudinally extending body portions, forms a thin shear layer 20 of highly turbulent air due to natural, well known boundary layer flow instability when the Reynolds number is high and also due to the effect of the disturbance of the air by projecting surfaces such as that formed by the windshield molding 13. The shear layer 20 thereafter impinges upon a surface which is angularly disposed with respect to the direction of air flow, such as the outwardly swung vent window 15. When this thin layer strikes the vent window 15 noise is created or generated which is transmitted into the interior of the vehicle.

As best seen in Fig. 4 wherein the noise reducing device including the imperforate plate 16 is attached to the leading edge of the front vehicle door 14, the rapid rearward movement in the direction of arrows a of the thin shear layer of highly turbulent air in close proximity with the longitudinally extending vehicle body portions, is obstructed and is deflected outwardly away from such body portions. The thin shear layer of highly turbulent air indicated in Fig. 4 by numeral 21 is disposed closely adjacent the outer edge of the imperforate plate 16 and extends rearwardly in the direction of arrows a therebehind so as to be disposed in widely spaced relation with the longitudinally extending vehicle body portions. Furthermore because of the operation of imperforate plate 16, a layer 22 of turbulent air, the energy content of which is substantially less than in shear layer 21 and the thickness of which approximates the width of the imperforate plate 16, is formed between the longitudinally extending body portions and the shear layer 21 behind plate 16. The air in layer 22 moves in relatively large vortices as indicated by arrows 22a as compared to the minute vortices 21a in shear layer 21 and it is particularly important that the energy content of these larger vortices is much smaller than that of the small vortices. Because the noise generated by the impinging of a layer of turbulent air against a surface or irregularity in a surface increases with increasing energy of the impinging turbulence, and with velocity of the mean flow upon which the turbulence is superposed, the impinging of air in layer 22 against the irregularities such as vent window 15 in the longitudinally extending body portions, will have the effect that only a very small amount of noise is created. Furthermore, because the extremely thin shear layer 21 of highly turbulent air is deflected outwardly by the imperforate plate 16 so that it will not engage the irregularities such as vent window 15 in the vehicle body portions, this layer has substantially no effect in generating noise by impingement.

It is believed that the graph in Fig. 5 is helpful to understand the nature of the mean or average air flow directly behind the imperforate plate and adjacent to the vehicle body portions. The turbulence is random fluctuation of the velocity from this mean velocity and may be said to be velocity fluctuations superposed on the mean flow.

It will be noted in Fig. 5 that the velocity of air flow in widely spaced relation with the vehicle body portions of which door 14 is a part, is represented by the substantially horizontal line b. The flow of air directly behind the imperforate plate 16 and adjacent the vehicle body portions is represented by the line c of relatively small slope. Studies of the flow indicate that parts of line c may even have small slopes in the opposite direction to that shown, i. e., the flow may be reversed in direction, though always very low in magnitude. Adjacent the outer edge of imperforate plate 16 the velocity of the air changes very rapidly in the shear layer 22 and has a high gradient and is indicated by the steeply sloped line d. It will therefore be seen that in considering the velocity of the air at progressively greater distances outwardly away from the vehicle body portions, the velocity changes magnitude gradually behind the imperforate plate 16 and at the outer edge of the plate 16 the velocity increases very sharply to the velocity of the air which is spaced widely from the vehicle body portions.

With reference to Fig. 4 of the drawings, it should be recognized that in the various makes and models of automotive vehicles, the vent windows 15 are of different sizes and particularly of different lengths, so that the trailing edge portion 15a of certain makes and models of motor vehicles will extend outwardly from the vehicle body portions to the position of the shear layer of highly turbulent air 21. Therefore it will be seen that depending upon the physical proportions of the vent window and the imperforate plate 16, the layer of air 21 will, in applications of the imperforate plate to certain motor vehicles, impinge upon the outer edge portion 15a of the vent window. Where the imperforate plate 16 permits the thin highly turbulent shear layer 21 to impinge upon the trailing edge portion 15a of the vent window 15 the noise reducing effect of the imperforate plate 16 is somewhat reduced as compared to the situation where, as in Fig. 4, the imperforate plate 16 positively precludes the shear layer of air from impinging upon the vent window. However, if the shear layer 21 engages only the trailing edge portion of the vent window, the air may be deflected fairly gently off the window without creating as loud noise as usual to be transmitted into the interior of the vehicle. Normally, the vent window shown in Fig. 4 will not be swung outwardly from the longitudinally extending vehicle body portions to an angle with respect to said body portion which exceeds 60 to 75 degrees. Therefore normal usage of the vent window 15 will not cause the outer edge portion thereof to swing outwardly into the layer 21 of highly turbulent air.

It will be seen that I have provided a novel and improved, inexpensive device adapted for attachment to a vehicle and operating to very substantially reduce the amount of noise created by air moving rapidly and rearwardly along the body portions of the vehicle, and it is believed that this is accomplished by obstructing the thin shear layer of highly turbulent air which normally moves in immediate proximity with the vehicle body portions and moving that layer outwardly into sufficiently widely spaced relation with the vehicle body portions and the irregularities therein and creating a substantially thicker layer of air having less turbulence energy in close proximity with the vehicle body portions.

It should also be apparent that I have provided a new method in the art of reducing air noise transmitted into a high speed vehicle which method causes the air which has a high noise generating capacity and which moves rapidly along the vehicle body portion to be so controlled as to substantially reduce the noise actually generated.

It will, of course, be understood that various changes may be made in the form, details, arrangement and proportions of the parts without departing from the scope of my invention which consists of the matter shown and described herein and set forth in the appended claims.

What I claim is:

1. A noise reducer for use with a high speed vehicle of the type having generally longitudinally extending body portions which includes windows and also includes irregularities such as outwardly swingable vent windows and which causes the formation of a thin layer of highly turbulent air therealong, said noise reducer comprising an elongated imperfoarte plate element having attachment means constructed and arranged to be secured to the vehicle and at a position forwardly of such windows and such irregularities in the body portions, said imperforate element extending generally outwardly from said body portion in a forwardly oblique direction, whereby to remove the thin layer of highly turbulent air away from the body portion and irregularities therein and thereby prevent generation of noise by such a layer and to create another layer of turbulent air having substantially less energy and lower mean velocity than said first mentioned layer behind said element and adjacent the body portion irregularities.

2. A noise reducer for use with a high speed vehicle of the type having generally upright and longitudinally extending surface portions with irregularities therein, said noise reducer comprising a generally upright and planar imperforate element having attachment means constructed and arranged to be secured to the vehicle forwardly of such body portion irregularities, said imperforate element extending outwardly and obliquely forwardly from the vehicle and also extending upwardly and downwardly sufficiently to protect, relative to the direction of rearwardly and rapidly flowing air moving along the vehicle, substantially all of the irregularities in the surface portions, whereby to markedly reduce the amount of high speed moving air which has high noise generating capacity which ordinarily impinges upon such surface portion irregularities.

3. The combination with an automotive vehicle of the type having irregular longitudinal body portions including an outwardly swinging vent window, of a noise reducer comprising a generally upright imperforate plate, attachment means secured to said body portion in a position forwardly of the vent window and also being secured to said plate, said plate extending outwardly away from said body portions in a non-rearward direction and beyond the limit of normal outward swinging of the vent window, whereby to deflect and restrict air moving at high speed rearwardly relative to the vehicle from impinging upon the vent window and other irregular body portions and thereby markedly reduce generation of noise due to the effect of such air.

4. The combination with a structure along which air moves at high velocity, said structure having a surface which produces, as the air moves therealong, a thin and highly turbulent layer of air, said structure also having a second surface spaced by air from said first mentioned surface and rearwardly thereof with respect to the direction of air movement, said second surface being disposed at an angle with respect to the direction of relative movement of the layer of air to be impinged upon thereby and thereby to create noise, said angularly disposed surface having an outer edge disposed transversely outwardly with respect to the direction of air movement from said first mentioned surface, of a noise reducer comprising an enlarged and substantially rigid imperforate planar plate attached to such a structure and having an inner edge disposed in closed proximity with said first mentioned surface, said plate extending transversely of the direction of movement of the air and outwardly from said first mentioned surface in a forwardly oblique direction, and said plate having an outer edge, the plate preventing the thin layer of highly turbulent air from flowing rearwardly from said first mentioned surface and toward said angularly disposed surface and said plate causing the thin and highly turbulent layer of air to flow rearwardly from said outer edge, the outer edge of said imperforate plate being disposed outwardly in a direction transversely of the direction of air flow from the outer edge of said angularly disposed surface whereby to prevent the thin highly turbulent layer of air from impinging said angularly disposed surface and thereby prevent the creation of noise.

References Cited in the file of this patent

UNITED STATES PATENTS

| | | |
|---|---|---|
| 1,988,016 | Nisbet | Jan. 15, 1935 |
| 2,468,439 | Gregorius | Apr. 26, 1949 |
| 2,685,470 | Werner | Aug. 3, 1954 |

FOREIGN PATENTS

| | | |
|---|---|---|
| 491,178 | Italy | Feb. 22, 1954 |